(12) United States Patent
Baker et al.

(10) Patent No.: US 7,871,000 B2
(45) Date of Patent: *Jan. 18, 2011

(54) CONFIGURATION SYSTEM AND METHOD

(75) Inventors: Peter C. Baker, Minneapolis, MN (US); Eric Roach, North Oaks, MN (US)

(73) Assignee: Computype, Inc., St. Paul, MN (US)

( * ) Notice: Subject to any disclaimer, the term of this patent is extended or adjusted under 35 U.S.C. 154(b) by 288 days.

This patent is subject to a terminal disclaimer.

(21) Appl. No.: 12/135,391

(22) Filed: Jun. 9, 2008

(65) Prior Publication Data

US 2008/0244701 A1 Oct. 2, 2008

Related U.S. Application Data

(63) Continuation of application No. 11/134,065, filed on May 20, 2005, now Pat. No. 7,469,828.

(51) Int. Cl.
*G06F 19/00* (2006.01)
*G06Q 30/00* (2006.01)
*G06Q 90/00* (2006.01)

(52) U.S. Cl. .................. 235/385; 235/375; 235/383; 235/494

(58) Field of Classification Search .............. 235/375, 235/383, 385, 472.1–472.03, 462.41, 494
See application file for complete search history.

(56) References Cited

U.S. PATENT DOCUMENTS

| | | | |
|---|---|---|---|
| RE30,958 E | 6/1982 | White | |
| 5,592,561 A | 1/1997 | Moore | |
| 6,069,955 A * | 5/2000 | Coppersmith et al. | 380/54 |
| 6,289,141 B1 * | 9/2001 | Roseman | 382/320 |
| 6,547,137 B1 | 4/2003 | Begelfer et al. | |
| 6,612,494 B1 * | 9/2003 | Outwater | 235/462.04 |
| 6,788,800 B1 | 9/2004 | Carr et al. | |
| 6,886,748 B1 | 5/2005 | Moore | |
| 7,152,047 B1 | 12/2006 | Nagel | |
| 7,469,828 B2 | 12/2008 | Baker et al. | |
| 2004/0172537 A1 | 9/2004 | Baus et al. | |
| 2004/0233463 A1 | 11/2004 | Hersch et al. | |
| 2005/0038756 A1 | 2/2005 | Nagel | |
| 2005/0234823 A1 * | 10/2005 | Schimpf | 705/50 |
| 2005/0239207 A1 | 10/2005 | Gelbart | |

(Continued)

OTHER PUBLICATIONS

U.S. Appl. No. 11/134,065, Response filed Jan. 14, 2008 to Final Office Action mailed Nov. 14, 2007, 7 p.

(Continued)

*Primary Examiner*—Thien M. Le
*Assistant Examiner*—Tuyen K Vo
(74) *Attorney, Agent, or Firm*—Schwegman, Lundberg & Woessner, P.A.

(57) ABSTRACT

An authentication method includes determining that a unique overt identifier is associated with a product; detecting that a random covert identifier is associated with the product, wherein the covert identifier includes at least one taggant particle, the unique overt identifier is combined with the random covert identifier, and the unique overt identifier is not a function of the random covert identifier; and comparing the unique overt identifier and the random covert identifier respectively to a unique overt number and a random covert number stored in a database.

23 Claims, 6 Drawing Sheets

U.S. PATENT DOCUMENTS

| | | | |
|---|---|---|---|
| 2006/0157559 A1* | 7/2006 | Levy et al. | 235/380 |
| 2006/0255130 A1 | 11/2006 | Whewell et al. | |
| 2006/0261158 A1 | 11/2006 | Baker et al. | |
| 2007/0016790 A1* | 1/2007 | Brundage et al. | 713/176 |

OTHER PUBLICATIONS

U.S. Appl. No. 11/134,065 Final Office Action mailed Nov. 14, 2007, 10 Pages.

"U.S. Appl. No. 11/134,065, Examiner Interview Summary mailed Aug. 31, 2007", 2 pgs.

"U.S. Appl. No. 11/134,065, Non Final Office Action mailed Jan. 29, 2007", 11 pgs.

"U.S. Appl. No. 11/134,065, Non Final Office Action mailed Jun. 12, 2007", 5 pgs.

"U.S. Appl. No. 11/134,065, Notice of Allowance mailed Aug. 22, 2008", 7 pgs.

"U.S. Appl. No. 11/134,065, Response filed Apr. 30, 2007 to Non Final Office Action mailed Jan. 29, 2007", 17 pgs.

"U.S. Appl. No. 11/134,065, Response filed Sep. 12, 2007 to Non Final Office Action mailed Jun. 12, 2007", 13 pgs.

* cited by examiner

| OVERT NUMBER | COVERT NUMBER | SECURE ASSOCIATION | |
|---|---|---|---|
| 1 & | 251 = | SECURE | ~520 |
| 2 & | 87 = | SECURE | ~521 |
| 3 & | 952 = | SECURE | ~522 |
| 4 & | 123 = | SECURE | ~523 |
| 5 & | 3 = | SECURE | ~524 |
| 6 & | 745 = | SECURE | ~525 |

*FIG. 5*

| OVERT NUMBER | COVERT NUMBER | SECURE ASSOCIATION | OTHER INFORMATION | |
|---|---|---|---|---|
| 1 & | 251 = | SECURE | | ~620 |
| 2 & | 87 = | SECURE | | ~621 |
| 3 & | 952 = | SECURE | | ~622 |
| 4 & | 123 = | SECURE | | ~623 |
| 5 & | 3 = | SECURE | | ~624 |
| 6 & | 745 = | SECURE | | ~625 |
| ⋮ | ⋮ | | ⋮ | |
| n & | 47 = | SECURE | | ~n |

*FIG. 6*

CONFIGURATION SYSTEM AND METHOD

RELATED APPLICATION

This application is a continuation under 37 C.F.R. 1.53(b) of U.S. application Ser. No. 11/134,065 filed May 20, 2005, now U.S. Pat. No. 7,469,828, issued on Dec. 30, 2008, which application is incorporated herein by reference and made a part hereof.

BACKGROUND

Identifiers have been used to identify all types of products. Labels are one type of identifier and can include a logo that identifies the source of a product and the type of a product. Sometimes the label includes a serial number. Special grading codes can be included in labels for the purpose of identifying the grade of a product, uniformity of a product or the source of a product. Labels are also placed on a product to specifically identify the exact source within a manufacturing plant of the product. A serial number or some other identifier can be used to identify the product while it is being manufactured. The serial number or some other identifier is scanned during the various stages of manufacture and records are kept as to the processes used and the manufacturing machines used to form the product. This can be useful in identifying the cause of product failures. For example, if one manufacturing machine is not performing correctly and some of the products made on the machine pass inspection or do not undergo inspection, a number of products can end up in the marketplace with an obvious defect or a latent defect. When the product fails, the manufacturing information can be used to track down other products that may also have the same latent defect.

Labels or similar identifiers are also used to authenticate a product when a product fails or when a product is returned. A manufacturer can be assured that they have ownership of a problem when the product label can be used to authenticate the product as one the manufacturer produced. In many product areas, there are large numbers of counterfeit goods that appear, especially to the consumer, to be original goods. When a counterfeit product is returned, in some instances manufacturers are fixing or replacing goods that they did not originally manufacture. This adds expense to the manufacturer.

Another problem is diversion of products. In some instances, certain parts are made by subcontractors of a manufacturer. The subcontractors generally bid for the job. The bidding can be fierce with high pressure to bid low. One tactic employed by subcontractors is to bid the jobs with little or no margin. The subcontractor produces more parts than is required by the contract with the idea that these additional parts can be sold as original parts. The profits are made on selling the additional parts. This tactic is known as diversion. When a diverted product is returned, in some instances manufacturers are fixing or replacing goods that they did not originally sell or manufacture. No profit was generated on the diverted product. Fixing or replacing diverted products also adds expense to the manufacturer of the product.

A constant challenge for manufacturers is to authenticate product that has been manufactured and sold by the manufacturer so that the responsibility for fixing or replacing a defective product can be determined to rest squarely with the manufacturer. The manufacturer loses money when products can not be authenticated and they fix or replace counterfeit products or diverted products.

BRIEF DESCRIPTION OF THE FIGURES

Embodiments of the present invention are illustrated by way of example and not limitation in the Figures of the accompanying drawings in which:

FIG. 5 is a data base having a plurality of records in which an overt number is associated with a cover number, according to an example embodiment.

FIG. 6 is a data base having a plurality of records in an overt number, a covert number and other information are associated, according to an example embodiment.

DETAILED DESCRIPTION

Figure 1:
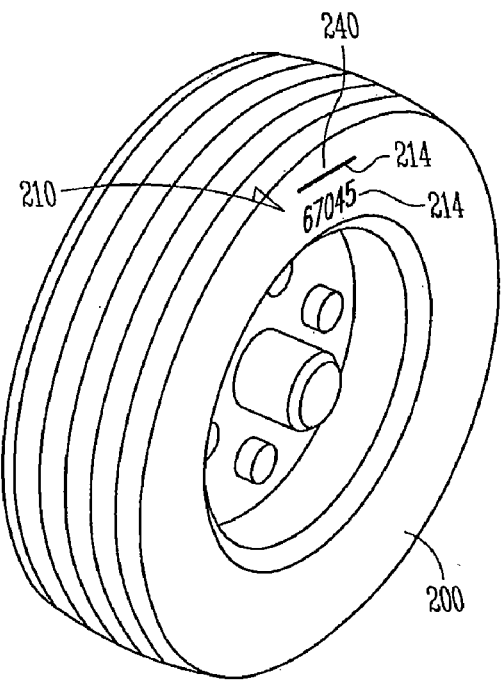
FIG. 1 is a schematic diagram illustrating a system for authentication of a product, according to an example embodiment.

A system and method for authenticating products are described herein. In the following description, numerous specific details are set forth. The following description and the drawing figures illustrate aspects and example embodiments of the invention sufficiently to enable those skilled in the art. Other embodiments may incorporate structural, logical, electrical, process, and other changes. For example, functions described as software may be performed in hardware and vice versa. Other structures may also be used and still be within the scope of the system and method described. Examples merely typify possible variations, and are not limiting. Individual components and functions may be optional, and the sequence of operations may vary or run in parallel. Portions and features of some embodiments may be included in, substituted for, and/or added to those of others. The scope of the embodied subject matter encompasses the full ambit of the claims and substantially all available equivalents.

Figure 2:
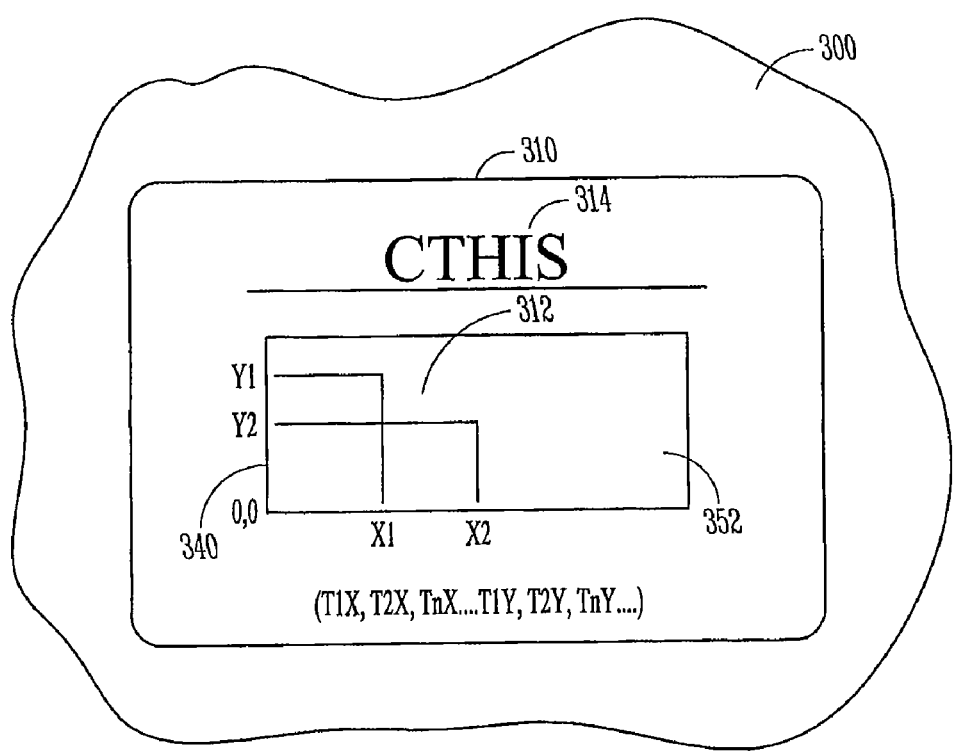
FIG. 2 is a perspective view of a product that includes an overt identifier and a covert identifier, according to an example embodiment.
Figure 3:
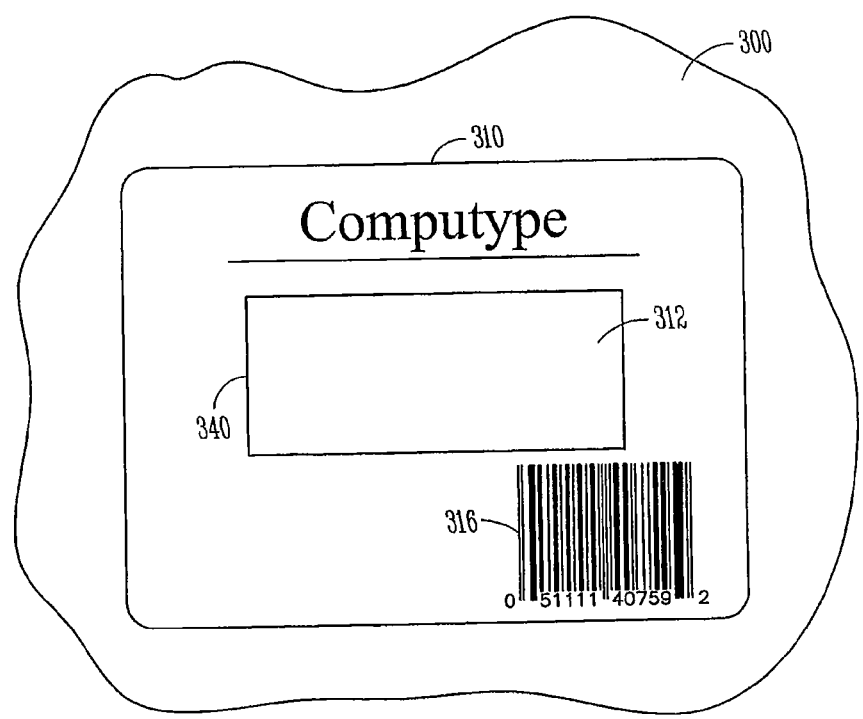
FIG. 3 is a view of a product that includes a label having an overt identifier and a covert identifier, according to an example embodiment.

FIGS. 1-3 show various example embodiments of a products marked with an identifier 210. The identifier 210 includes a covert identifier 212 and an overt identifier 214. FIG. 2 is a perspective view of a tire 200, as an example product, that includes an identifier 210 placed directly on the product 200. The identifier 210 includes an overt identifier 212 and a covert identifier 214. In some embodiments, the identifier 210 includes at least one direct marking on a product, which could be either the covert identifier portion, and an overt identifier portion. The overt identifier 212 is a marking that is capable of being detected by the naked eye or by a reader. The overt identifier 212 is also unique to the product, such as a serial number associated with the product. Although not required, the number may be one of a sequence of numbers. The covert identifier 214 is generally not visible. In one example embodiment, a covert identifier 214 is placed directly on the product 210. The covert identifier 214, in one embodiment, includes a taggant (shown in FIG. 2) which are microscopic particles that cannot be seen by the naked eye and are difficult to detect via forensic methods other than a specific detection method. The taggant can be combined with an ink or an adhesive and placed in at an assigned or selected location. As shown in FIG. 1, the product 200 includes a datum 240 that is used to locate the assigned or selected location where the covert identifier 214 is to be placed and later found. The datum 240 can include a bar or marking on the product 200. For example, the datum 240 may be the corner of a letter of the brand name of the product. In many products, the brand name is formed with the product. For example, some tires include raised letters used to indicate the brand of the tire. The brand name is formed when the tire is molded.

FIGS. 2 and 3 are views of products 300 that include a label 310 having an overt identifier 314 and a covert identifier 312, according to example embodiments. As shown in FIGS. 2 and 3, the label 310 is the identifier. The label 310 can be manufactured in a separate operation and applied to the product 300 during manufacture. This simplifies the manufacturing process for the product 300. In some embodiments, label 310 includes a datum 340 for locating an assigned or selected location of the covert identificatier 312. In some embodiments of the invention, the covert identifier 312 includes a taggant 352. The taggant 352 includes a plurality of microscopic particles that cannot be seen by the naked eye and are difficult to detect via forensic methods other than a specific detection method. The taggant 352 is shown in FIG. 2 for the sake of clarity. The taggant 352 can be combined with an ink or an adhesive and placed in at an assigned or selected location on the label 310. In other embodiments, the taggant 352 is combined with an ink or an adhesive and placed over a majority of the surface of the label 310. In still other embodiments, the taggant 352 is combined with an ink or an adhesive and placed over substantially the entire surface of the label 310. In such instances, the datum 340 is used to find the portion of the label 310 from which to read the taggants 352. As shown in FIG. 2, a pair of x-axis locations (x1 and x2) are selected and the y-axis locations of the particle found at the x-axis location is determined. The coordinates of the pair of particles are then used to generate a random number. This is one algorithm that is used to transform the random distribution of substantially invisible particles found in a taggant 352 into a random number. Of course, other algorithms can be used to generate a random number from the distribution of particles in the taggant 352. In some example embodiments, the actual pattern could be stored. This however, would require more memory than using an algorithm to generate a random number from the random distribution of particles associated with the taggant 352. As shown in FIG. 3, the overt identifier 314 need not be a number but can be a series of letters. In other embodiments of the invention, the overt identifier 314 can be a combination of letters and numbers which are unique to the particular manufactured item in a product line.

FIG. 3 differs from FIG. 2 in that the overt identifier 316 is a bar code placed on the label 310. The bar code includes a unique number, such as a serial number associated with the manufactured product 300. In addition, a brand name 320 is placed on the label. Again, the datum 340 could be set as a portion of one of the letters in the brand name or as the bar below the brand name. The taggant 352 is invisible to the naked eye in FIG. 3.

Figure 4:
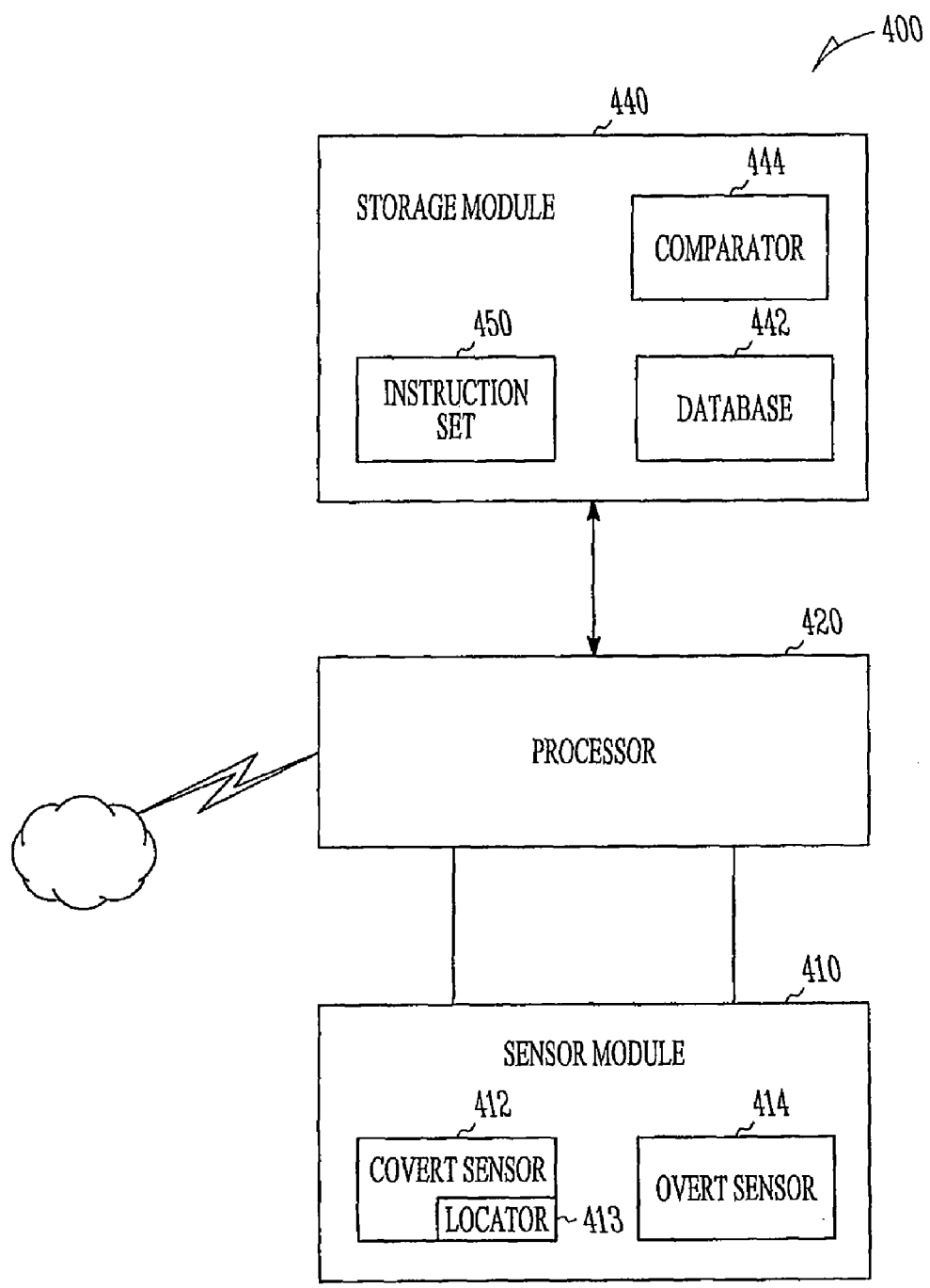
FIG. 4 is a view of a product that includes a label having an overt identifier and a covert identifier, according to an example embodiment.

FIG. 4 is a schematic diagram illustrating a system 400 for authentication of a product (such as products 200, 300 shown in FIGS. 1-3), according to an example embodiment. The authentication system 400 includes a sensor module 410, an information handling module 420, such as a processor or microprocessor, and a storage module 440. The sensor module 400 includes a first sensor 412 and a second sensor 414. The first sensor 412 includes a device for detecting a covert identifier 212, 312 associated with a product (shown in FIGS. 1-3). The second sensor 414 includes a device for determining or reading the overt identifier 214, 314 associated with the product 200, 300 (shown in FIGS. 1-3). The memory module 440 stores a value associated with a covert identifier 212, 312 and an associated value associated with an overt identifier 214, 314. The memory module 440 stores combinations of values associating an overt identifier 212, 314 with a covert identifier 212, 312 for a product type at the time of manufacture. The memory module 440 can also be used to store combinations of overt identifiers 214, 314 and covert identifiers 212, 312 from products that have left a factory or left the control of a manufacturer. The memory module 440 can store the associated combinations of overt identifiers and covert identifiers in a data base 442. More specifically, the memory module 440 can store the associated combinations of overt identifiers and covert identifiers as a plurality of records in a data base 442.

The authentication system 400 also includes a comparator 444 for comparing records found in the data base 442 with a detected value associated with a covert identifier 212, 312 associated with the product and a detected value of the overt identifier 214, 314, associated with the product, to a previously stored covert identifier 212, 312 associated with the product and previously stored overt identifier 214, 314 associated with the product 200, 300.

The authentication system 400 can also include a locator 413 for locating the covert identifier 212, 312 associated with the product 200, 300 (shown in FIGS. 1-3). The locator 413, in one embodiment, is adapted to locate a datum 240, 340 associated with the product 200, 300. Once the locator 413 determines the datum location 240, 340 on a product 200, 300 or on a label 310, a set of instructions or directions 450 stored in the storage module 400 is used to locate the covert identifier 212, 312. The datum 240, 340 can include a bar or marking on a label 310 or can include a marking on a product 200. For example, the datum 240, 340 may be the corner of a letter of the brand name of the product. In many products, the brand name is formed with the product. For example, some tires include raised letters that are formed when the tire is molded.

In some embodiments of the authentication system 400, a product 200, 300 is rejected as not authentic or as not manufactured and sold by a manufacturer if the covert identifier 212, 312 is not found or not located at the selected location for the product 200, 300. If the covert identifier 212, 312 is not found, then the product is rejected as being from a source other than the manufacturer. If a covert identifier 212, 312 is found in the selected location on the product 200, 300, then the covert identifier 212, 312 can be read or detected. Thus, detecting the presence of the covert identifier 212, 312 can be thought of as a way to quickly determine if the product 200, 300 may be authentic. As mentioned above, the covert identifier 212, 312 is substantially invisible. In other words, the covert identifier can not be seen by the naked eye and can only be detected and read with an appropriate sensor, such as the first sensor 412. In some example embodiments, the first sensor 412 for detecting a covert identifier operates outside the spectrum of visual light. The first sensor 412 can use ultraviolet (UV) light to detect the covert identifier. In other embodiments, the sensor detects the covert identifier non visually.

The authentication system 400 includes also includes further instructions in the instruction set 450 that cause the information handling module or the processor 420 to receive instructions from the storage module or memory unit 440. The instructions cause the information handling module or the processor 420 to perform operations including reading a covert identifier associated with a product, reading an overt identifier associated with the product, and matching a covert identifier with an overt identifier to authenticate the product. The instruction set 450 also includes sets of instructions for all the tasks that must be performed by the information handling module or the processor 420, including associating the overt identifier 214, 314 with the covert identifier 212, 312, driving the sensors 412, 414, and algorithms for determining a random number from the location of the randomly distributed particles associated with the taggant 352. The instruction set 450 also includes instructions for carrying out methods needed to authenticate or reject a product as not authentic.

In some example embodiments, the authentication system 400 includes a connection 460 to a network 470. The network can be a local area network (LAN) and wide area network (WAN) or the internet. The network connection allows various information handling systems 420 to share information and instruction sets. For example, the authentication system 400 shown in FIG. 4 could be a system at a manufacturing site where the product 200, 300 was originally produced. Other authentication systems remote from the authentication system 400 shown in FIG. 4 could communicate with the storage module 440 of the authentication system 400 shown to obtain secure associations or combinations of overt identifiers 214, 314 and covert identifiers 212, 312 to verify that products were indeed manufactured by the manufacturer. Of course, appropriate levels of authorization would be set in place to prevent corruption of the data in the data base 442.

FIG. 5 shows a representation of a data base 542 having a plurality of records 520, 521, 522, 523, 524, 525 in which an overt number 514 is associated with a covert number 512, according to an example embodiment. The overt number 514 is a number unique to the particular article manufactured. The covert number 512 is a number generated from a random distribution of particles at a particular location on a product or on a label attached or placed on a product. The combination of the random, covert number 512 and the unique overt number 514, such as a product serial number, is designated as a secure association in a secure data base 542 at the time of manufacture of the particular product. The association of the random, covert number 512 and the unique overt number 514 makes duplication of the product markings or duplication of the label 310 highly unlikely. Duplication is highly unlikely since the distribution of the particles of the taggant 352 (shown in FIG. 2) is random, and any number of algorithms can be used to generate a random number from the taggant. The algorithm can vary by the location of the datum or by the dimensions along the x or y axis where the particles are to be located to generate the random number. Thus, in order to duplicate the identifier 210, 310, the random distribution of particles must also be replicated.

FIG. 6 is a data base 642 having a plurality of records 620, 621, 622, 623, 624, 625 . . . n, in an overt number 614, a covert number 612 and other information 650 are securely associated within the data base 642, according to an example embodiment. The other information can include any type of data. There is no limitation to the type of data that can be associated with a particular record. For example, other information can include the product type or a product number, or information related to the manufacture of the particular device. For example, in many factories, each manufactured item is tracked during each stage of manufacture. Manufacturing an article of manufacture may require bending at one of twenty bending machines and may require welding at one of ten welding stations. The more complex the manufacturing process, the more possible manufacturing combinations exist. For a particular article of manufacture, the combination of machines and processes underwent during manufacture can be associated with the record in the data base 642. This information can be very helpful in isolating causes for product failure in the future. For example, products may be failing that were welded at one welding station. Rather than recalling an entire line of products, only certain ones need to be recalled which can help the manufacturer save on recall expenses. Other information may include distributors and buyers that filled in warranty registrations. Of course, the other information 650 stored in the data base 642 could be one or more pointers to records in other data bases that could contain the other information.

Figure 7:
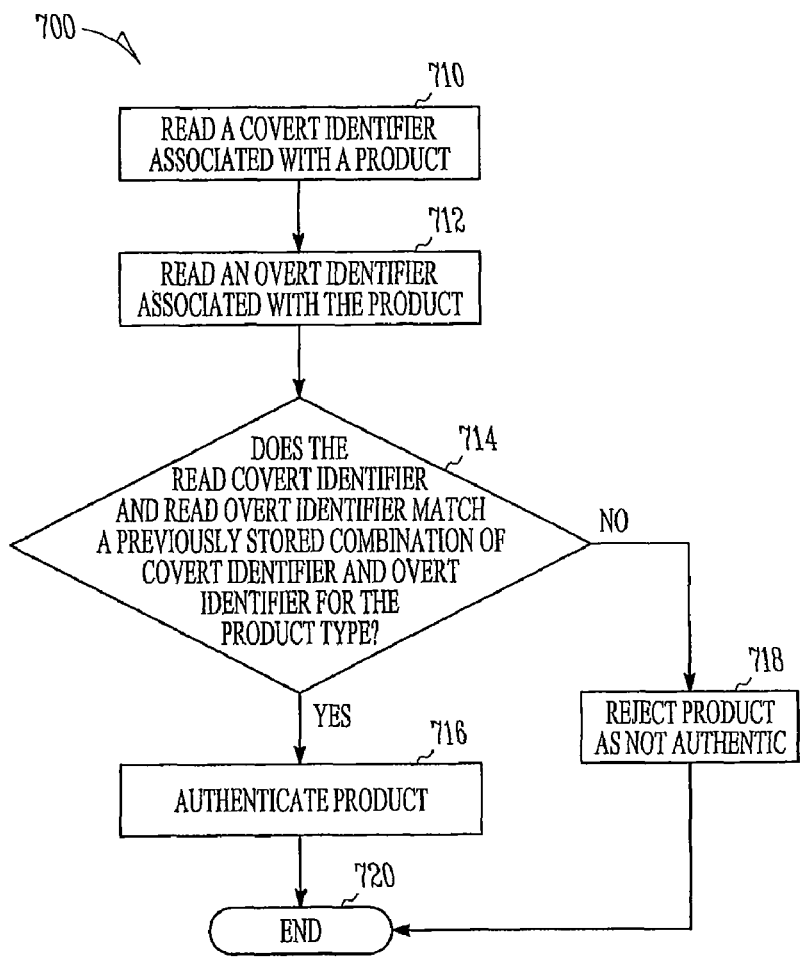
FIG. 7 is a flow diagram illustrating a method for authenticating or rejecting a product based on the covert and overt identifiers, according to an example embodiment.

FIG. 7 is a flow diagram illustrating a method 700 for authenticating or rejecting a product based on the covert and overt identifiers, according to an example embodiment. The authentication method 700 includes reading a covert identifier associated with a product 710, and reading an overt identifier associated with the product 712. A decision is then made as to whether the read covert identifier and overt identifier combination matches a stored combination covert identifier and overt identifier, as depicted by decision box 714. If the read combination matches a stored combination, the product is authenticated 716 and the process ends 720. On the other hand, if the read combination does not match a stored combination, the product is rejected as not authentic 718, and the process ends 720.

In some embodiments, the authentication method 700 includes labeling the product with a label that includes an overt identifier and a covert identifier. In other embodiments, the authentication method 700 includes marking the product with an overt identifier and a covert identifier. The covert identifier from the product, and the overt identifier from the product are stored at the time of manufacture and may be stored when subsequently read after manufacture. The covert identifier and the overt identifier are related to the product. In one embodiment, the covert identifier and the overt identifier are related in a data base of an information handling system. The covert identifier and the overt identifier can be related to the product by forming a record in a data base. Other manufacturing information can be related with the covert identifier and the overt identifier and the product. In one embodiment, the covert identifier is invisible to the naked eye. Reading the covert identifier associated with the product includes finding a datum associated with the covert identifier, and reading a pattern at a location related to the datum. In some embodiments, the method includes associating a unique number with the random pattern.

Another embodiment of an authentication method includes determining that an overt identifier is associated with a product, and detecting that a covert identifier is associated with the product. Detecting an overt identifier includes locating an area where a covert identifier is to be located, and determining the presence of the covert identifier. In some embodiments, determining the presence of the covert identifier includes determining the presence of a plurality of taggant particles. In other embodiments, the authentication method for determining the presence of the covert identifier includes reading the covert identifier.

In still another example embodiment, a method of product identification includes placing a covert identifier on a product, and placing an overt identifier on the product. The product identification method also includes relating the covert identifier and the overt identifier to the product. Relating the covert identifier and the overt identifier to the product can also include associating the covert identifier and the overt identifier in a data base. In some embodiments, other product information is also related with the product. In some embodiments, product manufacturing information is also related to the product. In some embodiments, placing a covert identifier on a product, and placing an overt identifier on the product includes labeling a product with a label that includes a covert identifier and an overt identifier. In some embodiments, the covert identifier is on a portion of the label.

Figure 8:
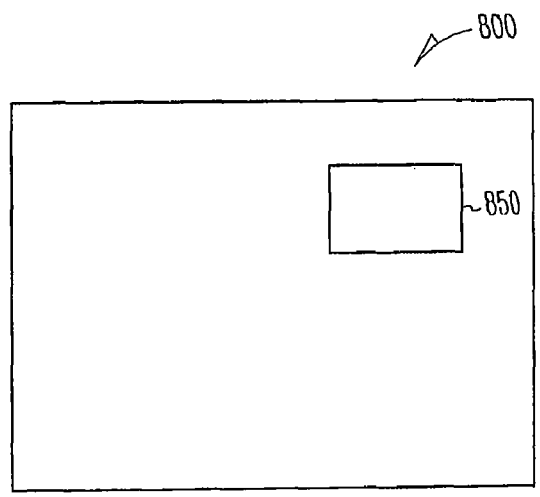
FIG. 8 is a schematic diagram illustrating a medium that includes an instruction set, according to an example embodiment.

FIG. 8 is a schematic diagram illustrating of a media 800 that includes an instruction set 850, according to an example embodiment. The machine readable medium 800 includes any type of medium such as a link to the internet or other network, or a disk drive or a solid state memory device, or the like. A machine-readable medium 800 includes instructions within the instruction set 850. The instructions, when executed by a machine such as an information handling system or a processor, cause the machine to perform operations that include reading a covert identifier associated with a product, reading an overt identifier associated with the product, and matching a covert identifier with an overt identifier to authenticate the product. The instructions can further cause the machine to perform operations that include storing a covert identifier from the product, and storing an overt identifier from the product. The instructions can further cause the machine to perform operations that include relating the covert identifier and the overt identifier to the product. The instructions can cause the machine to form a record in a data base. The instructions on the machine-readable medium can cause the machine to detect the existence of a covert identifier when reading a covert identifier associated with a product. The machine-readable medium can include instructions that, when executed by a machine, further cause the machine to detect a pattern using a sensor operating outside the visible range when reading the covert identifier, and associate a random number with the pattern. In some embodiments, reading a covert identifier includes instructions that, when executed by a machine, further cause the machine to find a datum associated with the covert identifier, read a random pattern at a location related to the datum, and associate a unique number with the random pattern. In some example embodiments, a random pattern representing the covert identifier is read and compared with a previously stored random pattern associated with the overt identifier.

Hardware and Operating Environment

This section provides an overview of the example hardware and the operating environment in which embodiments of the invention can be practiced.

Figure 9:
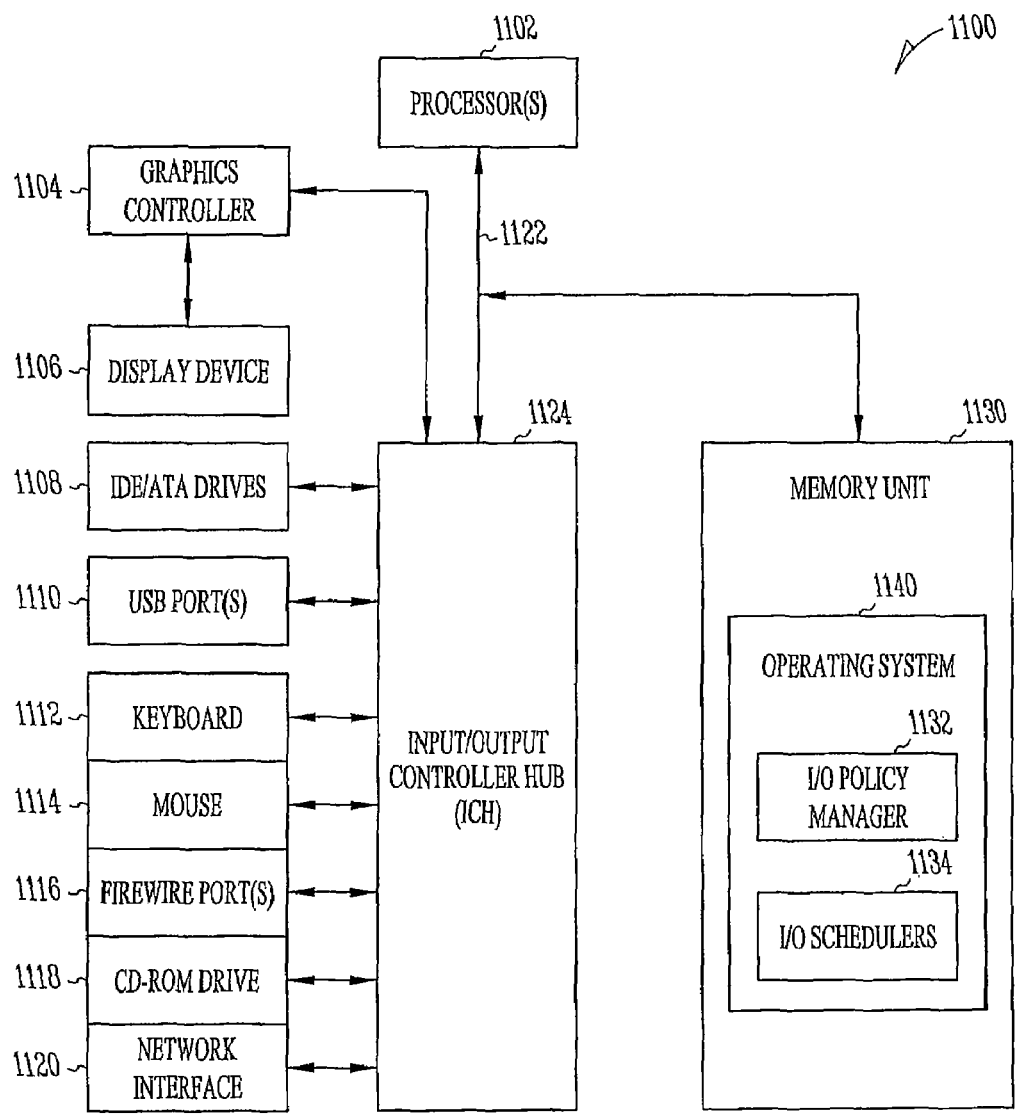
FIG. 9 illustrates an example computer system used in conjunction with certain example embodiments.

FIG. 9 illustrates an example information handling system or processor or computer system used in conjunction with certain embodiments of the invention. The information handling system or processor 420 can be a microprocessor or a computer system. As illustrated in FIG. 9, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read-only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. The ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for loading modules described herein. Furthermore, software can reside, completely or at least partially, within memory unit 1130 and/or within the processor(s) 1102.

Thus, a system, method, and machine-readable medium including instructions for Input/Output scheduling have been described. Although the present invention has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

What is claimed is:

1. An authentication method comprising:
   determining that a unique overt identifier is associated with a product; and
   detecting that a random covert identifier is associated with the product, wherein the covert identifier includes at least one taggant particle, wherein the unique overt identifier is combined with the random covert identifier, and the unique overt identifier is not a function of the random covert identifier; and
   comparing the unique overt identifier and the random covert identifier respectively to a unique overt number and a random covert number stored in a database.

2. The authentication method of claim 1 wherein detecting a covert identifier includes:
   locating an area where a covert identifier is to be located; and
   determining the presence of the covert identifier.

3. The authentication method of claim 2 wherein determining the presence of the covert identifier includes determining the presence of a plurality of taggant particles.

4. The authentication method of claim 2 wherein determining the presence of the covert identifier includes reading the covert identifier.

5. A method of product identification comprising:
placing a random covert identifier on a product that includes material for determining a random number; and
placing a unique overt identifier on the product, wherein the unique overt identifier is not a function of the random covert identifier, and wherein the unique overt identifier and the random covert identifier associated with the product are respectively used to compare to a unique overt number and a random covert number stored in a database to authenticate the product.

6. The product identification method of claim 5 further comprising relating the covert identifier and the overt identifier to the product.

7. The product identification method of claim 6 wherein relating the covert identifier and the overt identifier to the product further comprises associating the covert identifier and the overt identifier in a data base.

8. The product identification method of claim 6 further comprising relating other product information with the product.

9. The product identification method of claim 6 further comprising relating product manufacturing information to the product.

10. The product identification method of claim 5 wherein placing a covert identifier on a product, and placing an overt identifier on the product includes labeling a product with a label that includes a covert identifier and an overt identifier.

11. The product identification method of claim 10 wherein the covert identifier is on a portion of the label.

12. An authentication system comprising:
a sensor for detecting a random covert identifier associated with a product;
a sensor for determining a unique overt identifier associated with the product, wherein the unique overt identifier is not a function of the random covert identifier; and
a comparator for comparing the unique overt identifier and the random covert identifier associated with the product respectively to a unique overt number and a random covert number stored in a database.

13. The authentication system of claim 12 further comprising a locator for locating the covert identifier associated with the product.

14. The authentication system of claim 13 wherein the locator includes a datum associated with the product.

15. The authentication system of claim 12 further comprising means to reject authentication of the product when the covert identifier is not found in a selected position on the product.

16. The authentication system of claim 12 wherein the sensor for detecting a covert identifier associated with the product which operates outside the spectrum of visual light.

17. The authentication system of claim 12 further comprising a memory module for storing a value associated with a covert identifier and for storing a value associated with an overt identifier.

18. The authentication system of claim 17 further comprising a comparator for comparing a detected value associated with a covert identifier of a product with a previously stored value for the covert identifier previously associated with the product.

19. The authentication system of claim 17 further comprising a comparator for comparing a detected value associated with a covert identifier associated with the product and a detected value of the overt identifier associated with the product, to a previously stored covert identifier associated with the product and previously stored overt identifier associated with the product.

20. An identifier comprising:
a random covert identifier portion; and
a unique overt identifier portion, the covert identifier portion including particles, wherein the unique overt identifier is not a function of the random covert identifier,
wherein the unique overt identifier portion and the random covert identifier portion are respectively used to compare to a unique overt number and a random covert number stored in a database to authenticate a product with the identifier.

21. The identifier of claim 20 wherein the identifier includes at least one marking on a product.

22. The identifier of claim 20 wherein the identifier includes a label.

23. The identifier of claim 20 wherein the identifier includes a datum for locating a repeatable read portion of covert identification portion.

* * * * *

UNITED STATES PATENT AND TRADEMARK OFFICE
CERTIFICATE OF CORRECTION

| | | |
|---|---|---|
| PATENT NO. | : 7,871,000 B2 | |
| APPLICATION NO. | : 12/135391 | |
| DATED | : January 18, 2011 | |
| INVENTOR(S) | : Baker et al. | |

It is certified that error appears in the above-identified patent and that said Letters Patent is hereby corrected as shown below:

In column 3, line 25, delete "identificatier" and insert -- identifier --, therefor.

In column 3, line 39, delete "taggants" and insert -- taggant --, therefor.

Signed and Sealed this
Tenth Day of May, 2011

David J. Kappos
*Director of the United States Patent and Trademark Office*